United States Patent [19]

Griese et al.

[11] 4,354,411

[45] Oct. 19, 1982

[54] COLD SHEARS AND METHOD FOR CUTTING BILLETS AND BARS

[75] Inventors: Karl Griese, Düsseldorf; Emil F. Kersting, Ratingen; Rolf Schulte, Düsseldorf, all of Fed. Rep. of Germany

[73] Assignee: Sack GmbH, Düsseldorf, Fed. Rep. of Germany

[21] Appl. No.: 133,605

[22] Filed: Mar. 24, 1980

[30] Foreign Application Priority Data

Mar. 26, 1979 [DE] Fed. Rep. of Germany ....... 2911765

[51] Int. Cl.³ ............................................. B23D 15/02
[52] U.S. Cl. ......................................... 83/862; 83/49; 83/530; 225/103
[58] Field of Search .................. 83/862, 865, 881, 528, 83/530, 304, 305, 563, 628, 916, 49, 13; 74/571 M; 225/103

[56] References Cited

U.S. PATENT DOCUMENTS

| 2,182,162 | 12/1939 | Ostberg | 83/916 X |
| 2,443,685 | 6/1948 | Lyche | 83/530 |
| 2,632,509 | 3/1953 | Skillman | 83/862 |
| 3,152,499 | 10/1964 | Moelbert | 225/103 X |
| 3,202,029 | 8/1965 | Morath | 83/528 X |
| 3,237,829 | 3/1966 | Muntwyler | 225/103 |
| 3,453,914 | 7/1969 | Lemper | 83/881 |
| 4,160,409 | 7/1979 | Portmann | 83/530 X |

FOREIGN PATENT DOCUMENTS 1211453 12/1959 France ................................. 83/628

Primary Examiner—James M. Meister
Attorney, Agent, or Firm—John J. Dennemeyer

[57] ABSTRACT

The shears have a lower blade and an upper blade. The upper blade is reciprocated with respect to the lower blade through a transmission. The transmission includes a first eccentric which is continuously rotated to continuously reciprocate the upper blade over a vertical stroke equal to the throw of the first eccentric. This throw is transmitted to the upper blade through a second eccentric surrounding the first. The second eccentric is quickly rotatable, between two positions. In the first position, the upper blade is always clear of a billet on the lower blade. In the second position, the upper blade cuts the billet during the reciprocation. To ensure that the upper blade only penetrates approximately half the thickness of the billet, the position of the lower blade is vertically adjustable.

6 Claims, 5 Drawing Figures

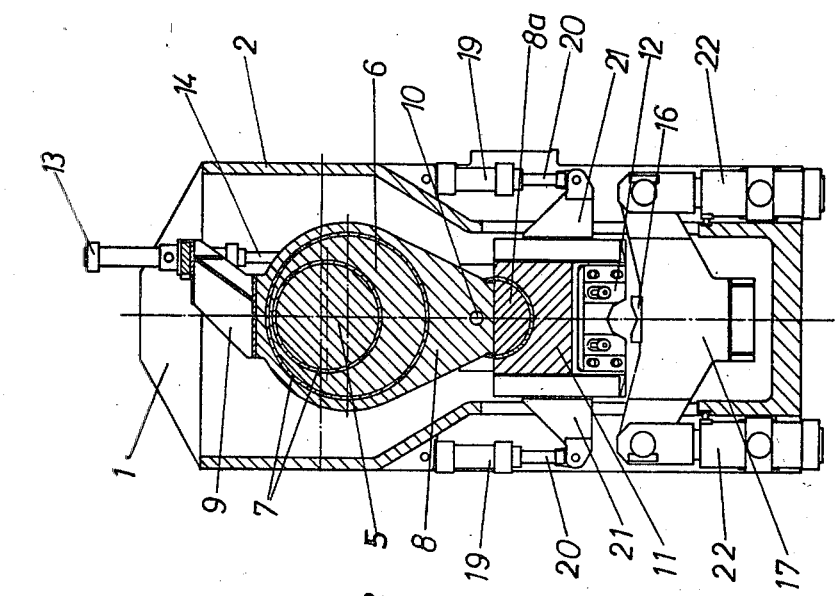
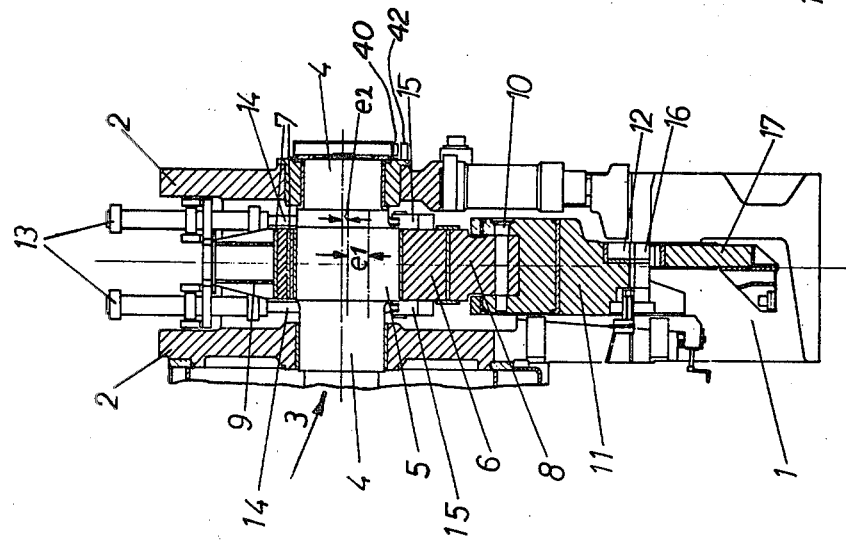

COLD SHEARS AND METHOD FOR CUTTING BILLETS AND BARS

BACKGROUND OF THE INVENTION

The invention relates to shears for cutting billets and bars of large cross-section, and more particularly to shears having two shearing blades which are able to move relative to each other and are located in blade holders, and with a crank drive for one blade holder, which is connected by way of a press rod to an eccentric of the crankshaft.

In known shears designed for cutting hot blocks and slabs (German OS No. 1 550 875), a continuously rotating crankshaft is provided. The crankshaft forms the driving member for one blade holder, so that for each revolution of the crankshaft, one blade holder carries out an up-and-down movement according to the offset of the eccentric. The second blade holder is stationary and is not moved, at least during the working or cutting stroke. The known shears are operated so that in addition to the drive for the crankshaft, a further driving device is incorporated, which comes into use during a return stroke of the eccentric. This second driving device adjusts or regulates the spacing of the two blades with respect to each other in the shear frame, due to which the shear blade is gradually moved in the direction of the other shear blade until the cut is achieved. The purpose and aim of these shears is to provide an eccentric with an offset only a fraction of the total stroke necessary for cutting and then to actuate this eccentric several times in the course of a parting cut, while the shear blade is moved gradually. Thus, a reduction in driving power is made possible due to the low moment of inertia ($GD^2$). Accordingly, for reasons of cost, a motor with lower torque may be used. This, however, is detrimental to production, since a plurality of working strokes is required for the final separation of the material.

To effect the continuous or gradual cutting movement of the movable blade holder, in addition to an extra drive required for a screw-down movement, a special coupling is needed between the motor and drive-transmission device. The coupling should allow rotation in only one direction, in order to prevent the drive for the screw-down movement to allow the shears to reverse direction due to the restoring force. Furthermore, the shears described are not suitable for cutting cold billets and bars. In cold billets and bars, a plurality of working strokes produce compression and consolidation of material at the cutting point during each stroke. This necessitates an enormously increased shearing force, which would ultimately lead to a need for increased performance and more expensive drives.

It is known to use so-called starting shears for cutting billets and bars. This type of shears has a crank stroke of the drive shaft which is sufficient to cut through the material in one working stroke. However, one drawback of these shears is that the starting shears must be started up on each occasion from an inoperative position and apply the force necessary for cutting to the shear blades within a short time, for example, six working strokes per minute every ten seconds. This means that there is a high power requirement which necessitates expensive driving devices in order to be able to achieve, in a short time, the high torque which is necessary at the low speeds of the eccentric shaft.

SUMMARY OF THE INVENTION

It is an object of the present invention to reduce the driving power needed when cutting bars of large cross-section by utilizing the fact that it is necessary to cut through only part of the cross-section of cold material in order to separate the cold material.

According to the present invention, there is provided shears for cutting billets and bars of large cross-section, comprising two shear blades movable relative to each other and located in blade holders, and a crank drive for one blade holder which is connected by way of a press rod to a first eccentric of a crankshaft whereby rotation of said first eccentric provides a cutting stroke of the blade in the driven holder, characterized in that the crankshaft is continuously rotated. A second eccentric is located on the first eccentric whereby the stroke of the driven blade holder is shiftable. The second eccentric is quickly movable between first and second end positions, a first end position corresponding to an upper dead center position of the cutting stroke of the driven blade and a second end position corresponding to an idle cut position of that blade. The stroke of the first eccentric is substantially smaller than the maximum thickness of the material to be cut, and the non-driven blade holder is adjustably mounted on the shears whereby the position of this blade holder can be varied along the cutting direction of the driven blade holder.

The present invention is based on the fact that in contrast to shears which always have to be started up anew, shears with a continuously rotating drive operate with a considerably lower driving power and thus can use more economical motors. This is true especially when the eccentric of the crankshaft can be kept small. The present invention allows even materials of large cross-section to be cut with only one working stroke because it utilizes the fact that when cutting cold billets and bars, it is only necessary to cut into the material until the "flow" of the material is achieved. The flow then leads to ultimate fracture. It is necessary to cut into the material by at least one third of the height of the cross-section in order to promote the flow effect. This means that, depending on the thickest material to be cut, the eccentric of the crankshaft must have an eccentricity of one third of this thickest material cross-section. In contrast to known shears, which do not cut thick work pieces in one operation or which require a large eccentricity of the crankshaft and high performance drives, with shears constructed according to the present invention, with a continuously rotating crankshaft, a separation of the material is achieved with only one cut due to a displacement of the cutting plane. That is, the stroke determined by the eccentric of the crankshaft is extended by tilting a second eccentric about the eccentric of the crankshaft according to the cutting depth necessary for the parting cut. The adjustment or shifting of the second eccentric from the idle cutting position takes place when the eccentric of the crankshaft passes the lower dead center position. For the purpose of adjustment by electrical means, a contact may advantageously be tripped for actuating adjusting cylinders, which rotate and thus lower the second eccentric in the press rod until it is located in a position at right angles to its initial position. The eccentricity of the second eccentric should be adjusted as far as possible so that in this lowered position, the blade is located with some play directly above the material. In the further course of the rotation of the crankshaft from the upper dead center position of the eccentric into the lower dead center position of the eccentric, the adjusted blade now comes into contact with the material and separates the latter. It is not necessary for the upper and lower blades to overlap, since after cutting into the cold material, a "flow" of the material is achieved leading to ultimate fracture. After the completed cut, the eccentric of the crankshaft moves from the lower dead center position into the upper dead center position. The second eccentric must be returned to the initial position during the same interval. This means that the adjusting cylinders must reverse the second eccentric quickly, within a short period of time.

Naturally, the invention is not restricted to the fact that the second eccentric is adjusted by means of the cylinders, on the contrary it is just as conceivable to undertake the adjustment by means of a worm drive for example, which would also have the additional advantage that the maximum possible adjustment range of 90° in the case of adjustment by means of cylinders can be extended to 180°. Ultimately, this would facilitate a reduction of the dimensions of the second eccentric.

BRIEF DESCRIPTION OF THE DRAWINGS

One embodiment of the shears according to the invention is illustrated in the drawings:

FIG. 1 is a longitudinal sectional view taken through the shear frame;

FIG. 2 is a cross-sectional view taken through the shear frame;

DETAILED DESCRIPTION OF THE PREFERRED EMBODIMENT

Figure 5:
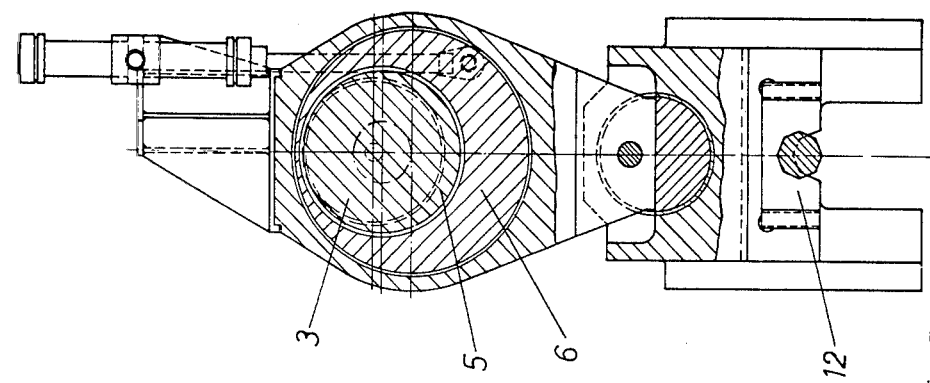
FIG. 5 is a cross-section of the shear frame similar to FIG. 3 showing the shears in the position after a cut has been completed.

A crankshaft 3 is mounted by its crank pin 4 in the uprights 2 of a shear frame 1. The crankshaft 3 is connected to a drive (not shown in detail) and comprises an eccentric 5 which is offset by the dimension e1 with respect to the crank pin 4. The eccentric 5 of the crankshaft 3 rotates in a second eccentric 6 offset by the dimension e2 with respect to the eccentric 5. The eccentric 6 is in turn guided in bearings 7 in a press rod 8. Above the crankshaft 3, the press rod 8 is fixed to a bracket 9. At the other end, the driven blade holder 11 for the shear blade 12 is attached to the press rod 8 for example by means of a bolt 10. The press rod 8 itself is supported by a bearing 8a. Also located on the bracket 9 are two adjusting cylinders 13 suspended so that they are able to swing and which can be actuated quickly. Cylinders 13, through their piston rods 14, engage side plates 15 located on both sides of the second eccentric 6. All the parts connected to the bracket 9 and press rod 8 are arranged to be raised and lowered between the uprights 2 of the shears, whereby due to the continuously rotating crankshaft 3, a crank stroke determined by the eccentric 5 of the crankshaft 3 is produced. This leads to a non-stop up-and-down movement of the driven blade holder 11. In the lowest position of the blade holder 11, the blade 12 is still at such a distance from the counter blade 16, which is carried by a stationary blade holder 17, that a material 18 to be cut can be supplied without hindrance to the remaining passage.

As soon as a working stroke, i.e. a parting cut, is to be carried out, a contact is preferably tripped electrically, depending on the rotary position of the crankshaft 3, which contact brings about actuation of the adjusting cylinders 13. Thus, the second eccentric 6 on the eccentric 5 of the crankshaft 3 is brought into its lowest position, whereby a shifting of the blade holder 11 is achieved simultaneously. Accordingly, the crankshaft 3 rotates further, the shear blade 12 is shifted downwards in its cutting plane by the rotation of the eccentric 6 and begins to cut. Blade 12 reaches its maximum cutting depth when in the lower dead center position, when eccentric 5 and adjusted eccentric 6 assume a vertical position.

Switches for controlling the adjusting cylinders can be mounted on upright 2 and actuated by a radial contact finger 40 attached to crank pin 4, shown in FIG. 1. Two switches may be used. The switches are offset by 90 degrees, and thus only one switch, designated by reference numeral 42, is shown in FIG. 1.

Also connected to the shear frame 1 are additional counter-balancing cylinders 19 which are constantly under pressure (FIG. 2). Cylinders 19 engage opposite sides of driven blade holder 11 by way of piston rods 20 and connecting elements 21. The counter-balancing cylinders 19 ensure that the blade holder 11 always bears against the press rod 8 through the bearing 8a without clearance.

The method of operation of the shears is described hereafter with reference to the positions of the eccentric and the parts of the installation guided so that they can be raised and lowered between the uprights of the shears. These positions are adjusted in various ways during the operation of the shears according to the present invention. Hoewever, the shears must first be adjusted to the thickness of the material to be cut. For this purpose, the retaining cylinders 22 raise or lower the non-driven blade holder 17 and then lock it immovably in position with the counter blade 16.

Figure 3:
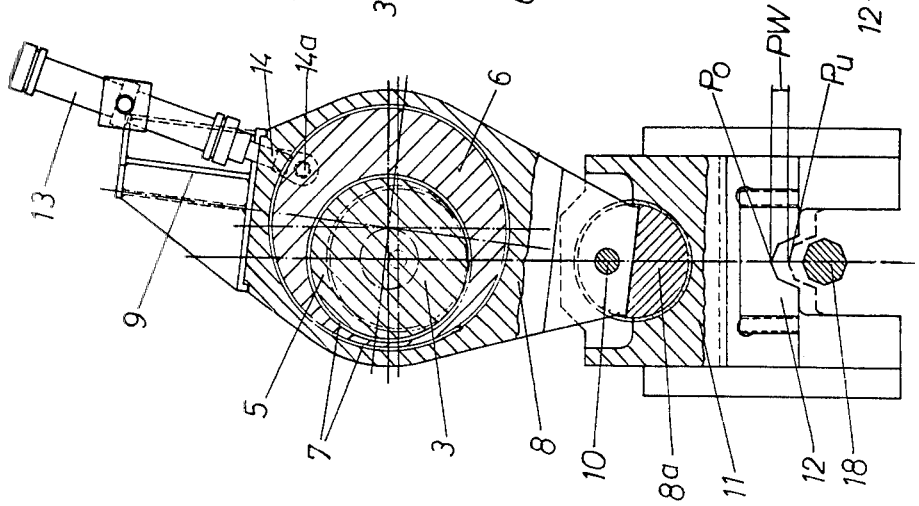
FIG. 3 is a partial fragmentary cross-section taken through the shear frame showing the shears in the initial operative position.

FIG. 3 shows the initial position of the shears before the beginning of a working stroke. In this case, the crankshaft 3 can rotate continuously, without a working stroke being carried out. The blade holder 11 with the upper blade 12 describes a certain swinging movement PW. When the eccentric 5 is located in the upper dead center position, blade 12 assumes the highest position Po and when eccentric 5 is located in the lower dead center position, blade 12 assumes the lower position Pu. The second eccentric 6 is located in a position level with the eccentric 5.

Figure 4:
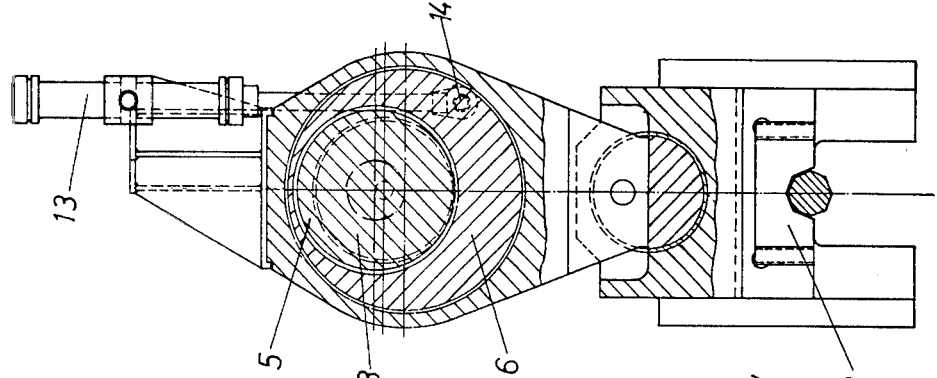
FIG. 4 is a cross-section of the shear frame similar to FIG. 3, showing the shears in the position directly before a cut.

FIG. 4 shows the situation immediately before the cut. When the eccentric 5 passes the lower dead center position, a contact is tripped electrically for example, preferably initiated by the rotary position of the eccentric 5. The contact causes adjustment of the eccentric 6 into a vertical position. In this position, the adjusting cylinders 13 are fully actuated, so that the cutting plane of the blade 12 is shifted down. When the blade holder 11 is raised, in the upper dead center position of the eccentric 5, the blade 12 is located directly above the material 18.

The swinging suspension of the cylinders 13 ensures that during the adjusting stroke the cylinder bodies can be adjusted automatically in their position. This is necessary, since the attachment points 14a of the piston rods 14 to the eccentric 6 move along an arc of a circle at the time of adjustment. The distance between the lowest position Pu of the upper blade 12 and the stationary counter blade 16 must be measured so that material 18 to be cut can be supplied to the shears by a roller bed (not shown in detail) without problem.

After the aforementioned adjusting movement of the eccentric 6, the eccentric 5 of the rotating crankshaft 3 moves from its upper dead center position into the lower dead center position and causes the blade to cut. The blade 12 cuts into the material 18 to the extent of the stroke of the eccentric 5 less the "clearance" between the material and blade when the eccentric 6 is adjusted. Blade 12 covers its maximum cutting distance when the eccentric 5 is exactly in the lower dead center position, as illustrated in FIG. 5. In this case, the shearing blades do not overlap, since the sears cut into the cold material only partly and the "flow" of the material caused by the cutting operation is then utilized for the ultimate separation.

At the same time at which the eccentric 5 moves from lower dead center position into the upper dead center position, the second eccentric 6 is rotated back into its horizontal initial position (FIG. 3). After an idle or swinging stroke, a new working stroke can be initiated when the eccentric 5 is once more located in the lower dead center position.

What is claimed is:

1. A method for shearing bars having a large cross-section, comprising:
    (a) placing a bar to be sheared over a stationary shear blade;
    (b) reciprocatingly moving a movable shear blade between upper and lower limits above said bar, so as not to contact said bar, by continuously rotating a crankshaft having an attachment connected to said movable shear blade; and
    (c) in response to the rotational position of said crankshaft, lowering said movable shear blade, on an up stroke of said reciprocating motion by rotating an eccentric mounted between said crankshaft and said movable shear blade to increase the distance between said movable shear blade and said crankshaft to lower said upper and lower limits by a distance sufficient to cause said movable shear blade to separate said bar entirely on the next successive down stroke of said reciprocating motion.

2. The method as set forth in claim 1, wherein the step of lowering comprises lowering said lower limit by a distance such that said movable shear blade penetrates said bar until a flow of material is achieved in said bar, said distance being less than the full extent of the cross-section of said bar.

3. Apparatus for cutting billets and bars of large cross-section, comprising:
    (a) a first shear blade;
    (b) a second shear blade;
    (c) means for reciprocatingly moving said second shear blade between first and second limit positions relative to said first shear blade, comprising: a crankshaft having an eccentric operatively connected to said first shear blade;
    (d) means for continuously rotating said crankshaft;
    (e) means for shifting said second limit position of said first shear blade comprising: a second eccentric mounted on said driveshaft eccentric and movable between a first and second end position for adjusting the distance between said first blade and said crankshaft eccentric; and
    (f) means responsive to the rotational position of said crankshaft for rapidly moving said second eccentric between said first and second positions while said first shear blade is moving toward said first limit position while said crankshaft is rotating;
    (g) wherein the stroke of said crankshaft eccentric is substantially smaller than the maximum thickness of the material to be cut but greater than a depth of said material necessary to achieve a flow of said material to cause complete separation of said material.

4. The apparatus as set forth in claim 3 and further wherein said means for rapidly moving includes switch means responsive to a rotational position of said crankshaft for initiating motion of said second eccentric.

5. The apparatus as set forth in claim 3 wherein said means for rapidly moving comprises at least one adjusting cylinder connected to said second eccentric.

6. The apparatus according to claim 4, and further including means for adjustably mounting said second shear blade to vary the position of said second shear blade along the cutting direction of said first blade.

* * * * *